United States Patent [19]

Courbot

[11] 4,174,770
[45] Nov. 20, 1979

[54] DRUM BRAKE

[75] Inventor: Pierre Courbot, Villiers le Bel, France

[73] Assignee: Societe Anonyme D.B.A., Paris, France

[21] Appl. No.: 883,064

[22] Filed: Mar. 3, 1978

[51] Int. Cl.² ............................................. F16D 65/56
[52] U.S. Cl. ........................ 188/79.5 P; 188/196 BA
[58] Field of Search ................. 188/328, 340, 79.5 B, 188/79.5 GE, 79.5 GC, 79.5 K, 79.5 P, 196 BA

[56] References Cited

U.S. PATENT DOCUMENTS

| | | | |
|---|---|---|---|
| 2,060,874 | 11/1936 | La Brie | 188/106 A |
| 2,094,391 | 9/1937 | White | 188/106 A |
| 2,292,017 | 8/1942 | Smith | 188/106 A X |
| 3,717,227 | 2/1973 | Rath | 188/79.5 P |

*Primary Examiner*—Duane A. Reger

*Attorney, Agent, or Firm*—Paul David Schoenle; Ken C. Decker

[57] ABSTRACT

A drum brake comprising a pair of brake shoes having adjacent ends engaged by a wheel cylinder and supported against a fulcrum block, respectively, is disclosed. A handbrake lever, pivoted on one of said shoes in the vicinity of the wheel cylinder, is capable of cooperating with a spacer located between the shoes in the vicinity of the wheel cylinder to urge the shoes toward a rotary drum. An automatic brake adjuster is provided between the spacer and the other of said shoes, and the handbrake lever engages the one shoe by means of a detachable abutment adapted to permit removal of the drum without resetting of the adjuster. The one shoe and the handbrake lever are received in a notch provided at one end of the spacer, and a substantially rectangular leaf spring is located between the lever and the adjacent edge of the notch to urge the lever against the one shoe in a direction substantially parallel to the drum axis.

17 Claims, 8 Drawing Figures

DRUM BRAKE

The invention relates to a drum brake for a motor vehicle brake system.

More particularly, the invention relates to a drum brake of the type comprising two brake shoes, having wearable friction linings, two adjacent ends of said shoes being supported against a fulcrum block, operating means being placed between the other two ends of the shoes to urge the latter towards a rotary drum, a handbrake lever being pivoted on one shoe in the vicinity of the operating means, the lever being capable of cooperating with spacer means located between the shoes in the vicinity of the operating means to urge the shoes towards the drum, the spacer means further comprising a spacer and self-adjusting means adapted to increase the distance between said other ends of the shoes when idle on wear of the friction linings, abutment means being provided between said one shoe and the lever to define the idle position of the lever, and resilient means being provided to normally hold the lever in its idle position.

In drum brakes of this type, the abutment means which define the idle position of the handbrake lever relative to the shoe on which it is mounted are essential to removal of the drum since the self-adjusting means restrict to a relatively small operating clearance the distance separating the drum from the friction linings of the shoes, irrespective of the degree of wear on the linings.

The abutment means are generally in the form of a stud associated with the handbrake lever and engaging the edge of the web of the shoe under the influence of a helical spring, having its respective ends connected to the shoe carrying lever and to a spacer which defines at least a portion of said spacer means. Such an arrangement has the disadvantage that vibrations caused when the vehicle travels over roads in poor condition are liable to cause the stud to move along the web unintentionally, resulting in particular in a substantial increase in the stroke required to operate the service brake by means of the brake operating means. Furthermore, the helical spring does not act only longitudinally on the spacer, but always tends to rotate the latter in a plane normal to the drum axis around the point of contact of the spacer with the shoe carrying the handbrake lever. This characteristic often results in a bad functioning of the automatic adjusting means.

The invention proposes a drum brake provided with abutment means allowing the shoes to be moved closer together to allow removal of the drum, means being provided to prevent the abutment means from becoming ineffective unintentionally.

To this end, a drum brake of the type defined above is characterized in that the resilient means act on the spacer and the handbrake lever in a direction substantially parallel to the drum axis so as to maintain the hand brake lever against the shoe.

It will be appreciated that with such an arrangement the abutment means will not risk to become ineffective accidentally, although no additional components are required for the conventional drum brake since the usual helical spring generally provided between the spacer and the shoe bearing the handbrake lever is omitted and replaced with other resilient means. Furthermore, these other resilient means do not tend to rotate the spacer, and therefore do not disturb the functioning of the adjusting means.

According to another feature of the invention, the resilient means act on at least one place of the lever substantially aligned with the abutment means in a direction parallel to the drum axis. In this case, the resilient means may also act on another place of the lever located in the vicinity of the pivoting axis of the handbrake lever.

According to a further feature of the invention, the resilient means comprise a metal leaf which acts by its two ends on the lever and by its central portion on the spacer.

Two particular embodiments of the invention will now be described by way of example with reference to the accompanying drawings, in which.

Figure 1:
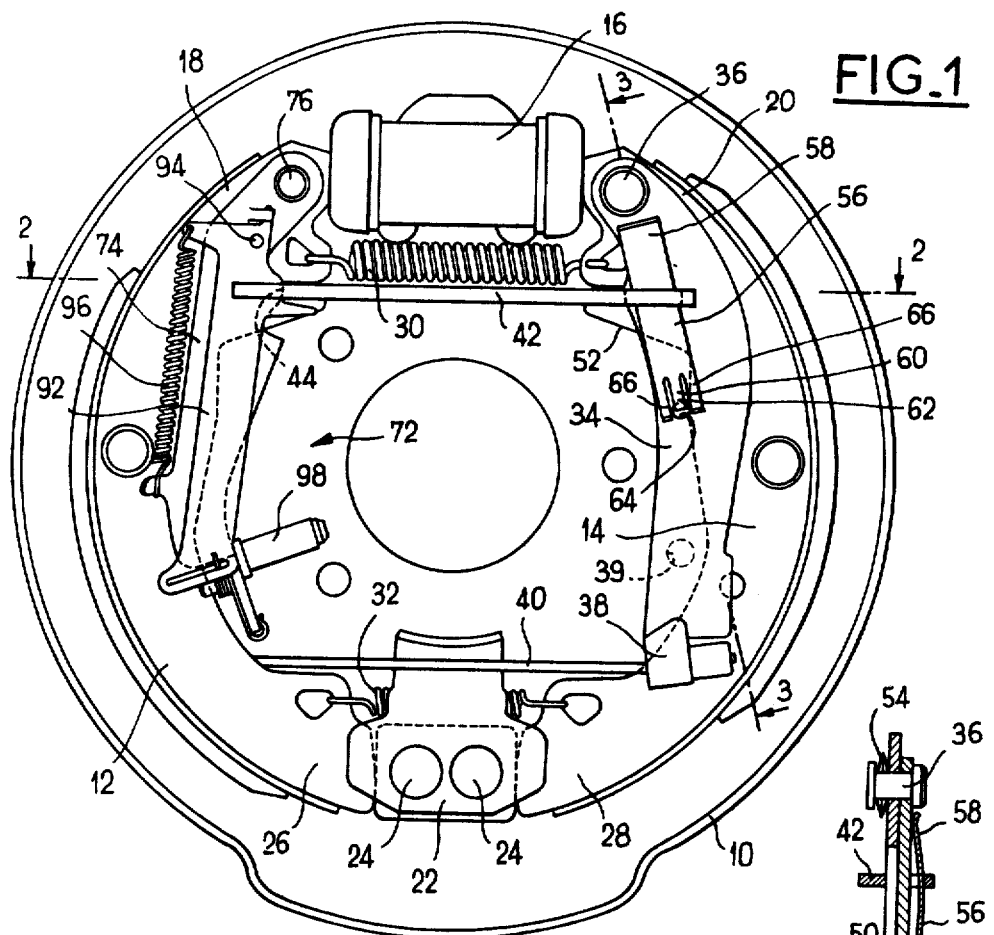
FIG. 1 represents an elevation of a drum brake embodying the principles of the invention.
Figure 2:
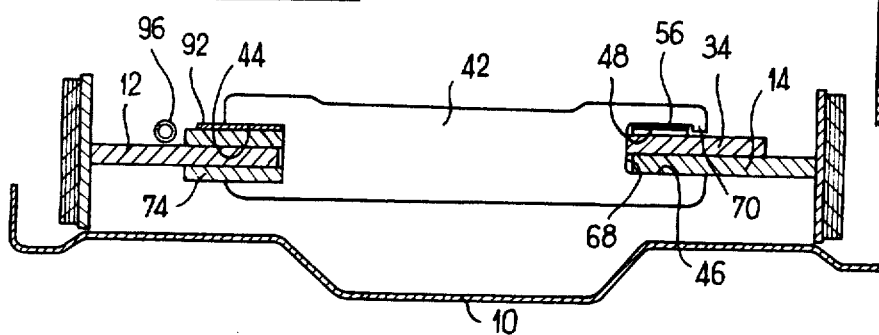
FIG. 2 represents a section along a line 2—2 in FIG. 1.

The drum brake illustrated in FIGS. 1 to 7 comprises a support plate 10 which is designed to be associated with a fixed component of the vehicle and which slidably receives two brake shoes 12, 14, each of said shoes having a web and a rim carrying a wearable friction lining. Operating means, consisting in the embodiment illustrated of a wheel cylinder 16, are inserted between two adjoining ends 18, 20 of the shoes 12, 14 respectively. Two helical springs 30, 32 are inserted between the ends 18, 20 and the ends 26, 28 respectively to return the ends towards the wheel cylinder 16 and towards the fulcrum block 22. A handbrake lever 34 is pivoted by means of a rivet 36 or the like on the end 20 of the web of the shoe 14. The handbrake lever 34 is bent back at its free end 38 so that it can receive the end of a handbrake cable 40. The pivoting of the lever 34 on the rivet 36 is transmitted to the brake shoe 12 by spacer means, comprising a spacer 42, the shape of which is best shown in FIG. 2. Each end of the spacer 42 defines a U-shaped notch 44, 46, which receives the web of the corresponding shoe 12, 14. The handbrake lever 34 is also received in the notch 46 with some clearance relative to the adjoining edge 48 of the notch 46. The spacer means also comprise self-adjusting means 72, described in more detail below, which are located between the spacer 42 and shoe 12 to increase the distance between the respective ends 18, 20 of the shoes 12, 14 when idle as a function of the wear on the linings of the shoes.

To allow removal of the drum (not shown), detachable abutment means are provided to normally define the idle position of the handbrake lever 34 relative to the brake shoe 14 while allowing the lever 34 to be pivoted beyond this idle position when removal of the drum is required. These abutment means consist in a known manner of a stud 50 formed by embossing the handbrake lever 34 so that it engages the inside edge 52 of the web of the shoe 14, and of a spring 54 associated with the rivet 36 in such a way as to permit the handbrake lever 34 to shift slightly away from the web of the shoe 14, allowing the stud 50 to cease engaging the edge 52 and slide freely over the web of the shoe 14 under the influence of the return spring 30.

Figure 3:
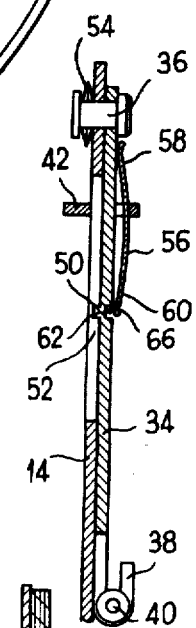
FIG. 3 is a section along a line 3—3 in FIG. 1.

In accordance with the invention, a resilient metal leaf 56 of substantially rectangular shape is provided to hold the handbrake lever 34 in its idle position, in which the stud 50 engages the inner edge 52 of the web of the shoe 14, and to prevent the stud 50 from moving accidentally along the web of the shoe 14 when the vehicle is travelling over roads in poor condition. The spring 56 acts on the spacer 42 and the handbrake lever 34 so as to urge the latter and to maintain the latter against the web of the shoe 14 in a direction substantially parallel to the drum axis (not shown). To this end, the spring 56 is bent along its longitudinal axis, as shown in FIG. 3, to act by its central portion on the edge 48 of the notch 46 facing the lever 34 by one 58 of its ends on the handbrake lever 34 near the rivet 36 on which the lever is pivoted, and by its other end 60 at a place substantially aligned with the stud 50 in a direction parallel to the drum axis. In the embodiment illustrated in FIGS. 1 to 3, the end 60 of the spring 56 comprises three tongues, of which one 62 enters a recess 64 in the handbrake lever 34 whereas the other two tongues 66 are resiliently supported on the handbrake lever on opposite sides of the recess 64. The recess 64 is preferable produced simultaneously with the stud 50 by embossing the handbrake lever 34. Furthermore, the central portion of the substantially rectangular spring 56 fits in the notch 46 between the base 68 of the latter and a lug 70 which defines on the edge 48 an abutment in the vicinity of the open end of this edge. Before assembly, the metal leaf spring 56 is bent along its longitudinal axis between its ends 58 and 60, so that during assembly it is prestressed in a direction substantially parallel to the drum axis between the edge 48 of the notch 46 and the handbrake lever 34. This prestress of the spring 56 is calculated to prevent the stud 50 from moving accidentally along that side of the web of the shoe 14 adjoining the handbrake lever 34, but it allows such motion if required. In addition, the tongues 66 are more flexible than the remainder of the metal leaf 56. Consequently, these tongues can absorb the operating clearances and therefore facilitate assembly. However, when there is excessive vibration, the tongues 66 flex so that the entire width of the end 60 of the leaf spring 56 abuts on the handbrake lever 34, so increasing the retaining load exerted by the spring 56 and preventing accidental escape of the stud 50. When the wear on the linings of the shoes 12, 14 and/or the wear on the drum (not shown) requires removal of the drum, the stud 50 must be moved, along that face of the web of the shoe 14 adjoining the handbrake lever 34 because of the self-adjusting means 72. This operation is carried out by pushing the free end 38 of the lever 34 away from the shoe 14, counteracting the spring 56, through an aperture 39 provided to this end in the plate 10, until the stud is no longer engaging the edge 52 of the web of the shoe 14. This is possible because the spring 54 associated with the rivet 36 allows slight pivoting of the lever 34 away from the shoe 14 around the rivet 36. The shoe return spring 30 can then urge the handbrake lever 34 counterclockwise in FIG. 1 round the rivet 36 through the spacer means comprising the adjusting means 72 and the spacer 42.

Figure 4:
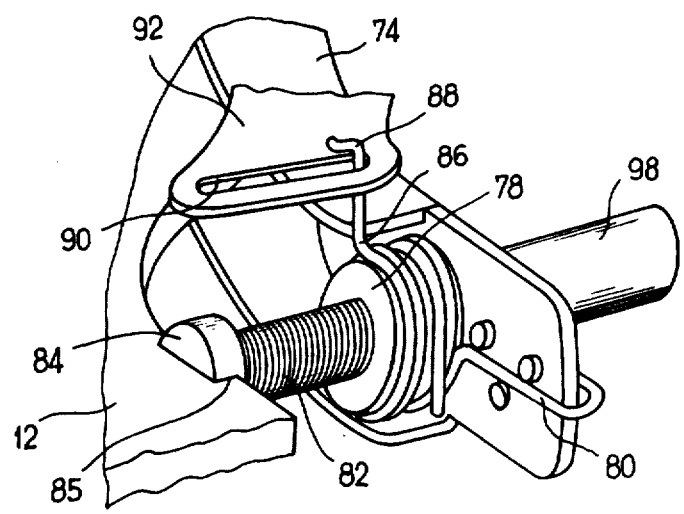
FIG. 4 is a perspective view of part of the adjusting means in the drum brake shown in FIG. 1.

The self-adjusting means 72 located between the spacer 42 and the brake shoe 12 comprise an adjusting lever 74 pivoted on a rivet 76 or the like on the web of the shoe 12 at the end 18 of the latter. As FIG. 4 shows, the adjusting lever 74 bears on its free end a nut 78 attached to it by a wire friction spring 80. The nut 78 is threadably received on a screw 82 having a head 84 provided with a slot 85 which receives the web of the shoe 12, thereby preventing the screw 82 from rotating relative to the shoe 12. Also, the adjusting lever 74 abuts on the base of the notch 44 receiving the shoe 12, so that the spacer means comprising the spacer 42, the lever 44, nut 78 and screw 82 defines with the aid of the shoe return spring 30 a variable distance between the ends 18, 20 of the respective shoes 12, 14 when in the idle position. This distance increases as a function of the position occupied by the nut 78 on the screw 82, the nut 78 being able to turn on the screw 82 in a direction to increase said distance and being prevented from rotating in the other direction since it is connected to the end of the lever 74 by the friction spring 80. Turning of the nut 78 in the direction to increase the distance between the ends 18, 20 of the shoes is effected by a second wire friction spring 86, of which one end 88 enters with a predetermined play a slit 90 in the free end of a lever 92 of which the other end is pivoted on the adjusting lever 74 by means of a rivet 94 or the like. Furthermore, a helical spring 96 is associated with the lever 92 near the rivet 94 and with the lever 74 near its free end, so as to maintain the base of the slot 85 in the head 84 of the screw 82 on to the edge of the web of the shoe 12 and urge the lever 92 counterclockwise in FIG. 1 round the rivet 94. As a result, the lever 92 abuts permanently on the base of the notch 44 in the spacer 42, irrespective of the position occupied by the shoes 12, 14.

Figure 5:
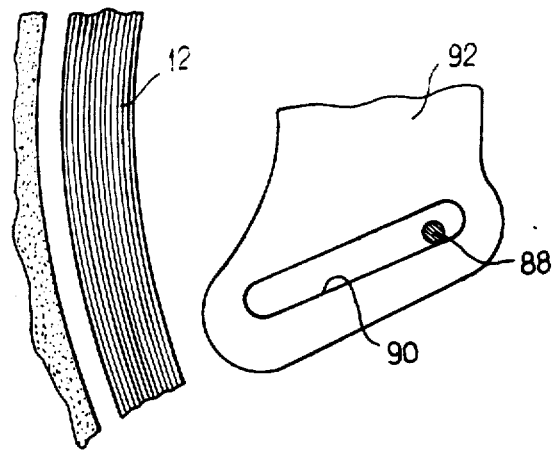
FIGS. 5, 6 and 7 illustrate diagrammatically different steps in the operation of the self-adjusting means in the brake shown in FIG. 1.
Figure 6:
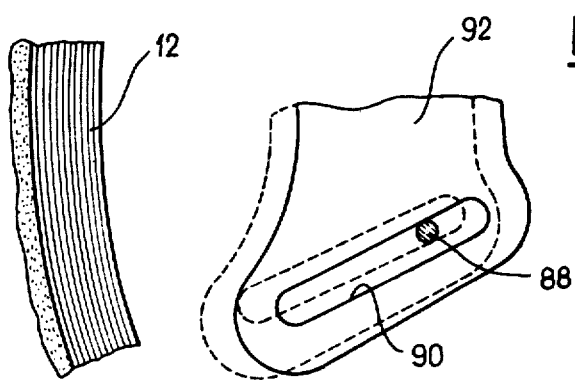
Figure 7:
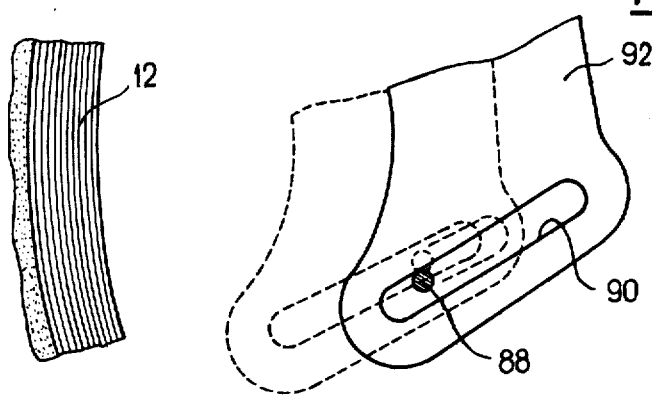

In the idle position, and when the linings of the shoes 12, 14 are new, the end 88 of the spring 86 occupies approximately the position shown in FIG. 5 relative to the slit 90. On operation of the wheel cylinder 16, the ends 18, 20 of the shoes 12, 14 respectively are urged apart until their linings engage the drum (not shown). During this movement, and under the influence of the spring 96, the lever 74 follows the movement of the brake shoe 12, while the lever 92 pivots on the rivet 94 so that the slit 90 shifts relative to the end 88 of the spring 86. If the clearance between the linings of the shoes 12, 14 and the drum is such that the end 88 of ths spring 86 passes simply from one edge of the slit 90 to the other, as shown in particular in FIG. 6, the nut 78 is not turned relative to the screw 82. If the wear on the linings is greater than the operating clearance, however, engagement of the upper edge of the slit 90 by the end 88 of the spring 86 causes the latter to turn relative to the nut 78, the latter being retained by the friction spring 80 since the motion imparted to the spring 86 tends to increase the diameter of its coils and therefore to reduce the friction force between this spring and the nut 78. When operation of the wheel cylinder 16 ceases, the shoes 12, 14 and levers 74, 92 resume the positions shown in FIG. 1 so that, after the operating clearance has been taken up, the spring 86 is turned in the opposite direction through an angle equal to the angle of rotation of this spring during operation of the wheel cylinder 16. In this direction the diameter of the coils of the spring 86 tends to decrease, so that the friction force between this spring and the nut 78 becomes greater than the friction force between the spring 80 and the nut. The spring 86 therefore turns the nut 78 on the screw 82 in the direction corresponding to motion of the free end of the lever 74 away from the shoe 12. The distance between the shoe ends 18, 20 in the idle position is therefore slightly greater than it was before operation of the wheel cylinder 16.

Preferably, a sleeve 98 of soft material such as flexible synthetic plastics is placed on the as yet unused portion of the screw 82 to protect the unused threads on the screw.

Note that with an adjusting device of this kind it is practically impossible to remove the drum, irrespective of the wear on the linings, in the absence of an abutment such as the abutment 50 by means of which the end 18, 20 of the shoes 12, 14 can be moved closer together.

The embodiment just described by way of example is not restrictive. In particular, the shape of the spring 56 and the shape and arrangement of the abutment means defining the idle position of the handbrake lever are not limited to those described by way of example.

Figure 8:
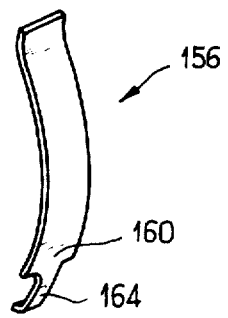
FIG. 8 is a perspective view of another embodiment of the spring used in the brake in FIG. 1.

For example, in variant of the spring 56, which is illustrated in a perspective view in FIG. 8 and in which elements corresponding to the elements of the spring shown in the brake in FIG. 1 bear the same reference numerals plus 100, the end 160 of the spring 156 has only one tongue 162, entering a recess in the handbrake lever. Although such a design does not have the advantages of the tongues 66 of the spring 56 mentioned above, particularly as regards installation of the spring, it substantially simplifies the shape of the spring and therefore, in particular, the cutting tool for making the spring.

What is claimed is:

1. In a drum brake:
    a rotary drum;
    a pair of brake shoes, each of said shoes carrying wearable friction linings;
    a fixed support having a fulcrum block receiving two adjacent ends of said shoes;
    brake operating means located between two other ends of said shoes and adapted to urge the latter toward the rotary drum;
    a handbrake lever pivoted on one of said shoes in the vicinity of the operating means;
    spacer means located between the shoes in the vicinity of the operating means, and capable to be engaged by the handbrake lever to urge said shoes toward the rotary drum;
    abutment means between said one shoe and said lever to define an idle position of the lever, said abutment means being disengageable from the one shoe by tilting the lever away from the first shoe around an axis substantially perpendicular to the pivotal axis of the lever;
    resilient means provided to normally hold the lever in its idle position;
    said spacer means comprising a spacer and self-adjusting means adapted to increase the distance between said other ends of the shoes when idle on wear of the friction linings; and
    said resilient means being inserted between the spacer and the handbrake lever so as to urge the latter toward the one shoe in a direction substantially parallel to the drum axis.

2. In a drum brake:
    a rotary drum;
    a pair of brake shoes, each of said shoes carrying wearable friction linings;
    a fixed support having a fulcrum block receiving two adjacent ends of said shoes;
    brake operating means located between two other ends of said shoes and adapted to urge the latter toward the rotary drum;
    a handbrake lever pivoted on one of said shoes in the vicinity of the operating means;
    spacer means located between the shoes in the vicinity of the operating means, and capable to be engaged by the handbrake lever to urge said shoes toward the rotary drum, said spacer means comprising a spacer and self-adjusting means adapted to increase the distance between said other ends of the shoes when idle on wear of the friction linings;
    abutment means between said one shoe and said lever to define an idle position of the lever;
    resilient means provided to normally hold the lever in its idle position, said resilient means being inserted between the spacer and the handbrake lever so as to urge the latter toward the one shoe in a direction substantially parallel to the drum axis; and
    each of said shoes comprising a web and a rim carrying said friction linings, said handbrake lever being pivoted on the web of said one shoe, said handbrake lever and the web of said one shoe being received in a U-shaped notch, provided at the first end of said spacer, said resilient means being inserted between the handbrake lever and an edge of said notch facing said lever.

3. A drum brake according to claim 2, wherein said resilient means comprise a leaf spring defining two ends engaging said lever and a central portion engaging said edge of said notch, said leaf spring being bent so as to be prestressed in a direction substantially parallel to the drum axis.

4. A drum brake according to claim 3, wherein a first of said ends of the leaf spring engages said lever at a place substantially aligned with said abutment means in a direction parallel to the drum axis, and the other end of the leaf spring engages said lever at another place located in the vicinity of the pivoting axis of the handbrake lever.

5. A drum brake according to claim 3, wherein said edge of said notch comprises a lug defining an abutment near its open end, the leaf spring being inserted between said abutment and a base of the notch.

6. A drum brake according to claim 3, wherein at least one of said ends comprises at least one tongue which enters a corresponding recess in said handbrake lever.

7. A drum brake according to claim 6, wherein said abutment means comprise a stud extending from the handbrake lever to engage a corresponding edge on said one shoe, said stud being formed simultaneously with said recess in the lever by embossing.

8. A drum brake according to claim 4, wherein said abutment means comprise a stud extending from the handbrake lever to engage a corresponding edge on said one shoe, said first end comprising at least one tongue which enters a corresponding recess in said handbrake lever, said stud being formed simultaneously with said recess in said lever by embossing.

9. A drum brake according to claim 6, wherein said end of the leaf spring comprises at least one other tongue which resiliently engages the handbrake lever.

10. A drum brake according to claim 8, wherein said first end of the leaf spring comprises at least one other tongue which resiliently engages the handbrake lever.

11. A drum brake according to claim 3, wherein said leaf spring is metallic and substantially rectangular in shape.

12. In a drum brake:
    a rotary drum;

a fixed support carrying a fulcrum block and brake operating means diametrically opposite one relative to the other with respect to the drum axis;

a pair of brake shoes, each of said shoes comprising a web and a rim carrying a wearable friction lining, each said shoes engaging the fulcrum block and the brake operating means by its opposite ends;

spacer means located between the shoes in the vicinity of the operating means, said spacer means comprising a spacer having a first end defining a U-shaped notch receiving a first of said shoes, and self-adjusting means provided between a second end of said spacer and the other shoe to increase the length of said spacer means on wear of the friction linings;

a handbrake lever pivoted on said first shoe and received in said notch;

detachable abutment means between said first shoe and the handbrake lever, said abutment means normally defining an idle position of said lever and being detachable by pivoting said lever away from the first shoe around an axis substantially perpendicular to the pivotal axis of said lever; and resilient means adapted to urge said lever towards its idle position;

said resilient means comprising a leaf spring prestressed between the handbrake lever and an edge of said notch facing said lever, so as to urge the latter towards the first shoe in a direction substantially parallel to the drum axis.

13. A drum brake according to claim 12, wherein said leaf spring is substantially rectangular and bent along its longitudinal axis to engage the handbrake lever by two ends and said edge of said notch by a central portion.

14. A drum brake according to claim 13, wherein a first of said ends of the leaf spring engages said lever at a place substantially aligned with said abutment means in a direction parallel to the drum axis, the other end of the spring engaging said lever at another place located in the vicinity of the pivoting axis of the handbrake lever.

15. A drum brake according to claim 14, wherein said abutment means comprise a stud extending from the handbrake lever to engage a corresponding edge on said first shoe, said first end of the lever comprising a tongue which enters a recess in the handbrake lever, said stud and said recess being formed simultaneously in said lever by embossing.

16. A drum brake according to claim 13, wherein said edge of said notch comprises a lug defining an abutment near its open end, said central portion of the leaf spring engaging said edge of the notch between the base of the notch and said abutment.

17. A drum brake according to claim 15, wherein said edge of said notch comprises a lug defining an abutment near its open end, said central portion of the leaf spring engaging said edge of the notch between the base of the notch and said abutment.

* * * * *